United States Patent [19]
Brouwer

[11] Patent Number: 6,164,148
[45] Date of Patent: Dec. 26, 2000

[54] MOTORIZED ACTUATOR FOR VEHICLE WING MIRRORS

[75] Inventor: Stefan Frits Brouwer, Den Haag, Netherlands

[73] Assignee: Eaton Corporation, Cleveland, Ohio

[21] Appl. No.: 09/161,140

[22] Filed: Sep. 25, 1998

[30] Foreign Application Priority Data

Sep. 26, 1997 [NL] Netherlands .......................... 1007139

[51] Int. Cl.[7] ............................ F16H 27/02; F16D 13/04
[52] U.S. Cl. ....................................... 74/89.14; 192/40.92
[58] Field of Search ............................. 74/89.14, 50, 49; 192/40.92, 51, 415; 296/152; 248/479; 359/843, 872, 874, 876; 70/264; 274/526

[56] References Cited

U.S. PATENT DOCUMENTS

| | | | |
|---|---|---|---|
| 3,972,597 | 8/1976 | Repay et al. ........................ | 248/479 X |
| 4,158,483 | 6/1979 | Fisher et al. ........................ | 74/89.14 X |
| 4,876,909 | 10/1989 | Andrei-Alexandru et al. ........ | 74/50 X |
| 5,159,854 | 11/1992 | Mino et al. ........................ | 74/89.14 X |
| 5,802,894 | 9/1998 | Jahrsetz et al. ........................ | 70/264 |
| 5,938,166 | 8/1999 | Seichter et al. ........................ | 248/479 |

*Primary Examiner*—David A. Bucci
*Assistant Examiner*—Colby Hansen
*Attorney, Agent, or Firm*—Roger A. Johnston

[57] ABSTRACT

An actuator having a motor for effecting a pivotal movement about two mutually perpendicular axes. A primary reduction step is formed by a worm and a worm wheel which is coupled to a rotation-selective coupling having two outputs. Each of those outputs is coupled respectively to a secondary reduction step, consisting of a worm and a worm wheel. Each secondary worm wheel is coupled to a part to be displaced.

15 Claims, 6 Drawing Sheets

MOTORIZED ACTUATOR FOR VEHICLE WING MIRRORS

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The invention relates to an actuator having two outputs for effecting two different, mutually independent setting movements. The two outputs may be connected to two different objects for setting the positions of those two objects independently of each other, but those two outputs may also be connected, at two different locations, with one object for effecting two different setting movements of that one object, for instance two pivotal movements about two different pivotal axes. In particular, the present invention relates to such an actuator having only one motor.

Such an actuator is in particular, but not exclusively, useful in a wing or outside mirror for a motorcar, and will therefore hereinafter be described for such a practical example.

Presently, the various types of wing mirrors are known, in which a mirror plate is adjustably mounted in a mirror housing, the position of that mirror plate being adjustable by a pivotal movement about two substantially perpendicular pivotal axes, which pivotal movements can be remotely performed by the driver from the driver's seat by means of motors likewise mounted in that mirror housing.

In a typical automotive wing mirror application, the mirror plate can be pivoted in four directions: up or down relative to a horizontal pivotal axis, and leftwards or rightwards relative to a vertical pivotal axis. Furthermore, it is known in such applications that the mirror plate can be adjusted from any orientation in any of these four directions, which offers much ease of operation. However, a drawback of such actuators is that they require two motors, each capable of rotating in two directions, one motor operating the up/down displacements and the other motor operating the left/right displacements. These two motors occupy relatively much space in the mirror housing, and render the actuator as a whole relatively expensive. Moreover, for operating these two motors, a likewise relatively expensive five-position switch is needed.

There is a need for an actuator capable of setting a part, such as a mirror plate, in any position, both in horizontal direction and in vertical direction, but whose construction is considerably less expensive. To meet this need, actuators have already been proposed which have only one motor. Such one-motor actuators are based on a cyclic displacement in each of the two freedoms of movement, one freedom of movement (horizontal) being operated by causing the motor to rotate in one direction, while the other freedom of movement (vertical) is operated by causing the motor to rotate in the other direction. Hence, in such actuators, it is not possible to adjust a mirror plate from any orientation in any of the four directions mentioned. With regard to the horizontal freedom of movement, energization of the motor will result in a leftward pivotal movement until the leftmost position is reached; next, the mirror plate will perform a rightward pivotal movement until the rightmost position is reached, whereupon the direction of the pivotal movement is reversed again, and so on, which is referred to as a cyclic movement.

A one-motor actuator therefore comprises first cyclic displacement means for effecting a cyclic movement of the part to be displaced in a first direction, second cyclic displacement means for effecting a cyclic movement of the part to be displaced in a second direction, and separation-transmission means which are coupled between the motor and the first and second cyclic displacement means for driving the first cyclic displacement means when the motor is rotated in one direction, and for driving the second cyclic displacement means when the motor is rotated in the other direction.

German Offenlegungsschrift 4,321,847 describes a one-motor actuator in which a worm mounted on the output shaft of the motor drives two gear wheels. Each gear wheel drives a second worm via a one-direction coupling. Each second worm drives a worm wheel coaxially coupled to a circular disk. A coupling rod to the mirror support plate is eccentrically mounted on the circular disk.

This known actuator has a relatively large number of parts. Further, this known actuator has the drawback that the motor must at all times drive two gear wheels which are both provided with a one-direction coupling, as a consequence of which the known actuator has a relatively low efficiency. Further, in this known actuator, the one-direction couplings are loaded rather heavily.

In particular when used in a motor vehicle wing mirror, it is desired that the mirror plate can also be adjusted manually by exerting an external force, for instance in the event of a defect to the electric operating mechanism. For that purpose, the coupling rod of the known actuator is of a two-piece construction, the first bar-shaped part being capable of pivoting telescopically in the second part, which is substantially constructed as a hollow cylinder. The first bar-shaped part has its outer surface provided with ribs, and the second hollow cylindrical part has its inner surface provided with springing projections cooperating these ribs. When an external force is exerted, these projections move across these ribs, causing the axial length of the coupling bar to change.

Two major drawbacks are inherent in this construction. Firstly, it is not possible to retrieve the original position with certainty by exerting an external force in opposite direction. Secondly, it is not possible to undo the manual change, i.e., the changed axial length of the coupling bar, by a subsequent electric adjustment, which means that after a manual adjustment, the adjusting range of the actuator has changed.

Another example of a one-motor actuator is described in U.S. Pat. No. 4,474,428 in which a speed-reducing mechanism is arranged, in alignment with the motor shaft. In such an arrangement two drive disks are eccentrically mounted concentrically with the driven shaft of the speed-reducing mechanism, each drive disk being coupled to an output of an axial two-way coupling. One of those drive disks is disposed without play in a fork construction which is mounted with a bearing in the mirror housing for a linear movement, while the other one of those drive disks is surrounded without play by a ring which is connected, via a curved bar, to the mirror support plate. This known construction, also, has a number of drawbacks. Important disadvantages of this known construction are that the construction is fairly complicated and requires much space; and, the mirror cannot be adjusted manually.

BRIEF SUMMARY OF THE INVENTION

It is an object of the invention to overcome the above-mentioned drawbacks of the prior art.

It is a general object of the present invention to provide a one-motor actuator which is simpler and more inexpensive. More in particular, it is an object of the present invention to provide a one-motor actuator having a small number of parts, which parts can be manufactured and assembled in a relatively simple manner.

It is a further object of the present invention to provide an actuator which can also be manually adjusted such that the electric adjusting range has not changed after the adjustment, while the actuator can manually be returned into the starting position again with certainty.

These and other aspects, characteristics and advantages of the present invention will be clarified by the following specification of a preferred embodiment of an actuator according to the invention, with reference to the accompanying drawings.

DETAILED DESCRIPTION OF THE INVENTION

Figure 1:
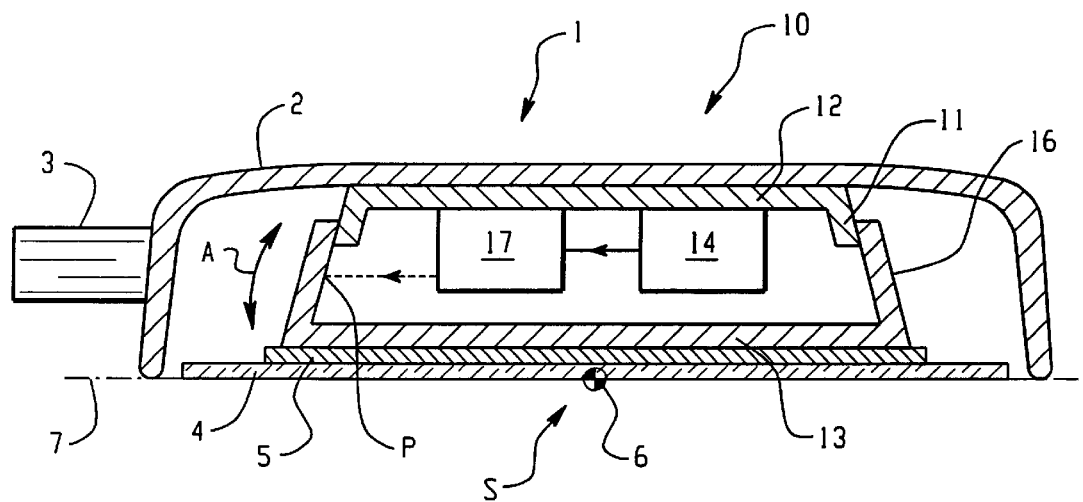
FIG. 1 schematically shows a section of a wing mirror.

Mirror-adjusting instruments for wing or outside mirrors, for pivoting a mirror plate in two mutually perpendicular directions, are generally known and the construction thereof will hereinbelow be discussed only, with reference to FIG. 1, which schematically shows a horizontal section of a wing mirror indicated generally at 1. The wing mirror 1 comprises a bowl-shaped mirror housing 2, mounted via a base 3 on a vehicle, not shown. A mirror plate 4 is mounted on a mirror support plate 5 capable of pivoting relative to the mirror housing 2 about a vertical pivotal axis 6 and about a horizontal pivotal axis 7. The intersection indicated generally at S of the pivotal axes 6 and 7 is preferably located as close as possible to the exterior surface of the mirror plate 4. Disposed in the mirror housing 2 is an actuator indicated generally at 10. The actuator 10 comprises an actuator housing 11 having a bottom part 12 and a cover part 13. The bottom part 12 of the actuator housing 11 is attached, for instance by screws, to the mirror housing 2, while the cover part 13 of the actuator housing 11 is attached, for instance likewise by screws, to the mirror support plate 5.

The mirror support plate 5 may also form an integral part of the cover part 13 of the actuator housing 11. The cover part 13 is connected to the bottom part 12 so as to be substantially dustproof, in order to protect the actuator components disposed in the actuator housing 11.

Arranged in the actuator housing 11 and fixed relative to the bottom part 12 is a single electromotor 14. A driving coupling means 17, to be described hereinbelow, engages at an engagement point P, the cover part 13 of the actuator housing in order to impart a movement to cover part 13 in the direction designated by the arrow A, causing the mirror plate 5 and the mirror 4 mounted thereon to make a pivotal movement about the pivotal axis 6.

In a comparable manner, coupling means are provided which engage another point of the cover part for effecting a pivotal movement about the other pivotal axis 7, as will be appreciated by anyone skilled in the art and which is not shown in FIG. 1 for the sake of simplicity.

Figure 2:
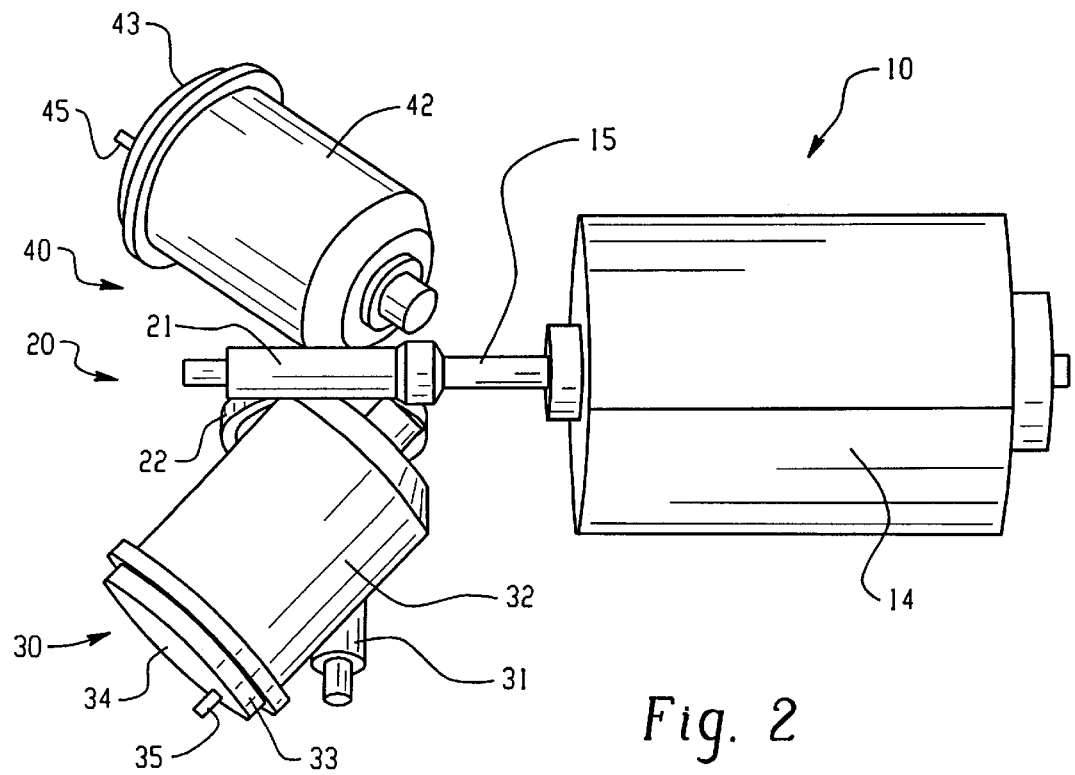
FIG. 2 is a perspective view of the moving parts in an embodiment of the actuator according to the present invention.

FIG. 2 is a perspective view of some important parts of the actuator 10, in their spatial orientation relative to each other. These parts are arranged in the actuator housing 11, not shown in FIG. 2 for the sake of clarity.

The actuator 10 comprises a single motor 14, symmetrically disposed in the actuator housing. The motor 14 has electric connecting points which are not shown in FIG. 2 for the sake of simplicity, and can rotate clockwise or anticlockwise, depending on the voltage presented.

The motor 14 has a driven shaft 15 a primary worm 21 mounted thereon. The primary worm 21 drives a primary worm wheel 22, which is also symmetrically arranged in the actuator housing 11. The combination of the primary worm 21 and the primary worm wheel 22 forms a first reduction step indicated generally at 20 of the actuator 10.

Arranged on either side of the primary worm wheel 22 are two secondary worms 31, 41 with only worm 31 visible in FIG. 2. The axes of rotation of the secondary worms 31, 41 are in line, substantially at right angles to the axis of rotation of the primary worm 21, and each drive a secondary worm wheel 32, 42. The combination of the first secondary worm 31 and the first secondary worm wheel 32 forms a second reduction step 30 of the actuator 10 with regard to a pivotal movement about one pivotal axis, while the combination of the not visible second secondary worm 41 and the second secondary worm wheel 42 forms a second reduction step indicated generally at 40 of the actuator 10 with regard to a pivotal movement about the other pivotal axis. In principle, the two reduction steps 30, 40 are identical yet mirrored relative to each other, and symmetrically arranged relative to each other, for which reason only the reduction step 30 will be further discussed hereinbelow.

Figure 3A:
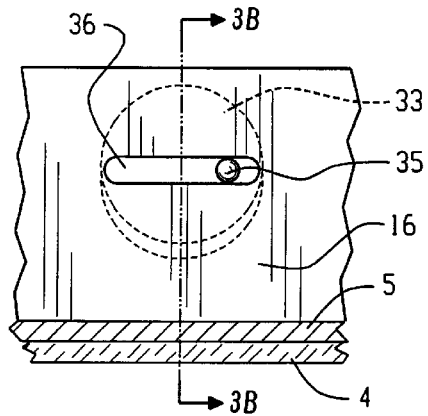
FIG. 3A is a schematic side elevation of a detail of an actuator housing.
Figure 3B:
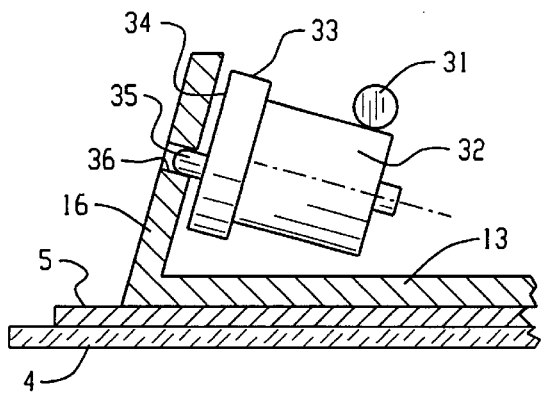
FIG. 3B schematically shows a section taken on the line 3B—3B in FIG. 3A.

FIG. 3A is a schematic side elevation of a portion 13 of the actuator housing 11 at the location of the engagement point P; and, FIG. 3B schematically shows a cross section of the first secondary worm wheel 32 at the location of the engagement point P.

Coaxially mounted on the first secondary worm wheel 32 is a disk 33 whose circumferential face serves as bearing face for the first secondary worm wheel 32. A pin 35 is eccentrically mounted on the axial end face 34 of the disk 33 facing away from the first secondary worm wheel 32. The cover part 13 of the actuator housing 11 comprises a wall portion 16 which is arranged at an angle to the mirror support plate 5 and which is provided with a slot 36 directed substantially parallel to the mirror support plate 5 as shown in FIG. 3A. The pin 35 engages in this slot 36.

Preferably, the worm wheel 32 and the disk 33 form an integral part, while the pin 35 may also be manufactured integrally with the disk 33, so that the combination of worm wheel 32, disk 33 and pin 35 may form a single part which can readily be manufactured by, for instance, injection molding.

It will be understood by anyone skilled in the art that a rotation of the worm wheel 32 via the coupling between pin 35 and slot 36 results in a reciprocating movement of the cover part 13 of the actuator housing 11 in the direction A, i.e., a reciprocating pivotal movement of the mirror support plate 5.

The actuator 10 can be of such design that the secondary worm wheel 32 is at all times coupled via the pin 35 and the slot 36 to the wall portion 16 of the cover part 13 of the actuator housing 11, if manual adjustment of the mirror plate 4 is dispensed with. However, the invention provides in a relatively simple manner a force-limited coupling between the pin 35 and the slot 36 to the wall portion 16 of the cover part 13 of the actuator housing 11, if manual adjustment of the mirror plate 4 is dispensed with. However, the invention provides in a relatively simple manner a force-limited coupling between the pin 35 and the slot 36, by which it is meant that when an external force in excess of a given threshold level occurs, the pin 35 will leave the slot 36. That threshold level is chosen so that during normal operation, the frictional forces occurring will remain below that threshold level, but that threshold level can, without excessive effort, be overcome through the manual exertion of a pressure force on the mirror plate 4.

The present invention provides several variants for realizing such force-limited coupling between the pin 35 and the slot 36. In a first variant, the wall portion 16 is slightly flexible, as a result of which that wall portion 16 will bend slightly outwards during the occurrence of an external force, causing the distance between that wall portion 16 and the disk 33 to increase.

Figure 4A:
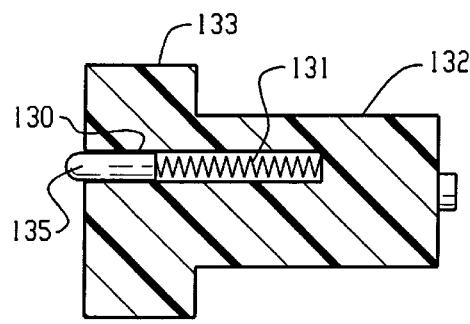
FIG. 4A schematically shows a longitudinal section of an embodiment of a secondary wheel.
Figure 4B:
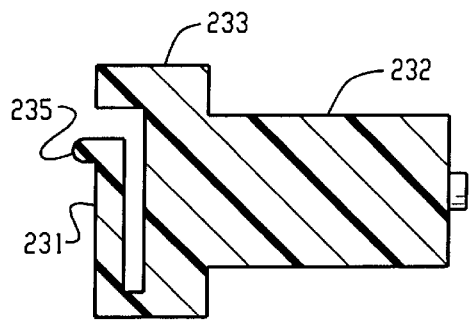
FIG. 4B schematically shows a longitudinal section of another embodiment of a secondary worm wheel.

In a second variant, the axial position of the pin 135 relative to the worm wheel 132 is variable. Examples of this second variant are illustrated in FIGS. 4A and 4B, each showing a longitudinal section of a worm wheel 132. In the exemplary embodiment illustrated in FIG. 4A, the worm wheel 132 is provided with an eccentrically positioned, axially directed bore 130, in which a pin 135 is arranged so as to be axially slidable. Arranged between the pin 135 and the bottom of the bore 130 is a resilient member 131 which presses the pin 135 outwards, i.e., leftwards in FIG. 4A. Preferably, the pin 135 is replaced by a ball. In the exemplary embodiment illustrated in FIG. 4B, the worm wheel 232 comprises a flexible L-shaped lip portion 231, having one end thereof attached at an edge portion of the disk 233, while the other end of that L-shaped lip 132 defines the pin 235. An advantage of this last exemplary embodiment is that the combination of worm wheel 232, disk 233 and L-shaped lip 231 with pin 235 can be manufactured as a single, integral part.

Referring to FIGS. 1 through 3B, in order to facilitate the uncoupling of the pin 235 and the slot 36, the edge portions of the slot 36 are preferably slightly beveled or rounded, and the pin 235 preferably has a convex or frusto-conical end.

If the mirror plate 4 is adjusted manually and the pin 35 has left the slot 36, the position of the pin 35 remains unchanged. In accordance with an important aspect of the present invention, the original position of the mirror plate 4 can subsequently be found back again in a simple manner, because when the mirror plate 4 and the pin 35 are manually pivoted back, the pin 35 and the slot 36 will meet each other again, with the pin 35 slipping into the slot 36. In accordance with another important aspect of the present invention, it is also possible to adjust the mirror plate 4 through operation of the motor 14 again after a manual adjustment of the mirror plate 4, because upon rotation of the worm wheel 32, the pin 35 will first move along the wall portion 16 until it meets the slot 36, involving the pin 35 slipping into the slot 36. It will be understood that the adjusting range of the mirror plate 4 will not have been affected by the earlier manual adjustment.

In principle, the wall portion 16 may be a flat wall portion. However, the wall portion preferably has the shape of a portion of a spherical surface, with the center of that sphere substantially coinciding with the intersection S of the pivotal axes 6 and 7. In that case, the end face 34 of the disk 33 preferably has the shape of a portion of a spherical surface as well, with the center of that spherical surface likewise substantially coinciding with the intersection S of the pivotal axes 6 and 7. The axis of rotation of the worm wheel 32 then preferably extends through this intersection S. This implies that the two axes of rotation of the two secondary worm wheels 32, 42 will intersect at the point S. Accordingly, the two axes of rotation of the two secondary worm wheels 32, 42 are in that case oblique relative to the respective axes of rotation of the respective secondary worms 31, 41, for which reason the secondary worm wheels 32, 42 then have an axial length greater than the diameter of the corresponding worms 31, 41.

In the embodiments described hereinabove, the axis of rotation of the secondary worm wheel 32 is substantially perpendicular to the wall portion 16.

Figure 5:
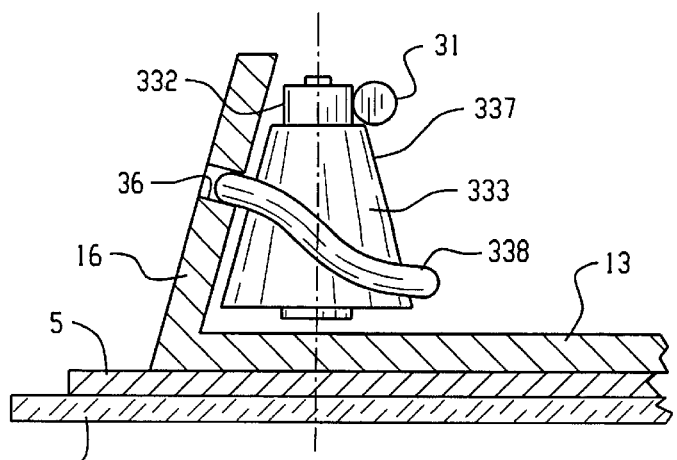
FIG. 5 shows a section, comparable with FIG. 3B, of a structural variant.

Referring to FIG. 5, in an alternative embodiment, the axis of rotation of the secondary worm wheel 332 is substantially perpendicular to the mirror support plate 5, and the disk 333 is in engagement with the wall portion 16 via its surface 337, as illustrated in FIG. 5. The axis of rotation of the secondary worm wheel 332 is then substantially perpendicular to the axis of rotation of the corresponding secondary worm 31. In this case, the disk 333 has a greater axial length, while the diameter of the disk 333 is preferably a function of the axial position, adapted to the contour of the wall portion 16. In the example illustrated in FIG. 5, a projecting ridge 338, closed in itself, is formed on the face 337 of the disk 333, which ridge engages in a recessed portion or groove 36 of the wall portion 16. The function of that ridge 338 is comparable with the function of the pin 335 described first: upon rotation of the worm wheel 332, the axial position of that portion of the ridge 338 which faces the wall portion 16 changes, and the groove 36 of the wall portion 16 follows that changing axial position in a cyclic manner.

Alternatively, the ridge 338 may be replaced by a groove closed in itself, with the wall portion 16 having a projecting pin instead of a slot 36, which pin engages in the groove mentioned. An advantage of such embodiment, not separately shown for simplicity's sake, is that in that case, a play-free contact between the disk 33 and the wall portion 16 can be guaranteed more easily at all angular positions of the worm wheel 32.

An advantage of the use of a ridge or groove on the face 337 of the disk 333 is that it is possible to adjust the relation which describes the position of the wall portion 16 as function of the angle of rotation of the worm wheel 332, within certain limits.

As will be understood by anyone skilled in the art, the position of the wall portion 16 of the embodiment illustrated in FIGS. 3A–B can be described as a sinus of the angle of rotation of the worm wheel 32; this implies that at a constant rotational speed of the worm wheel 32, the displacement speed of the wall portion 16 can be described as a cosine of the angle of rotation of the worm wheel 32, i.e., adjacent the extreme positions the displacement speed is fairly low, and adjacent the central position the displacement speed is fairly high. By selecting a suitable form for the ridge or groove on the face 337 of the disk 333, that displacement speed can be kept virtually constant through a wide range of positions.

Figure 6:
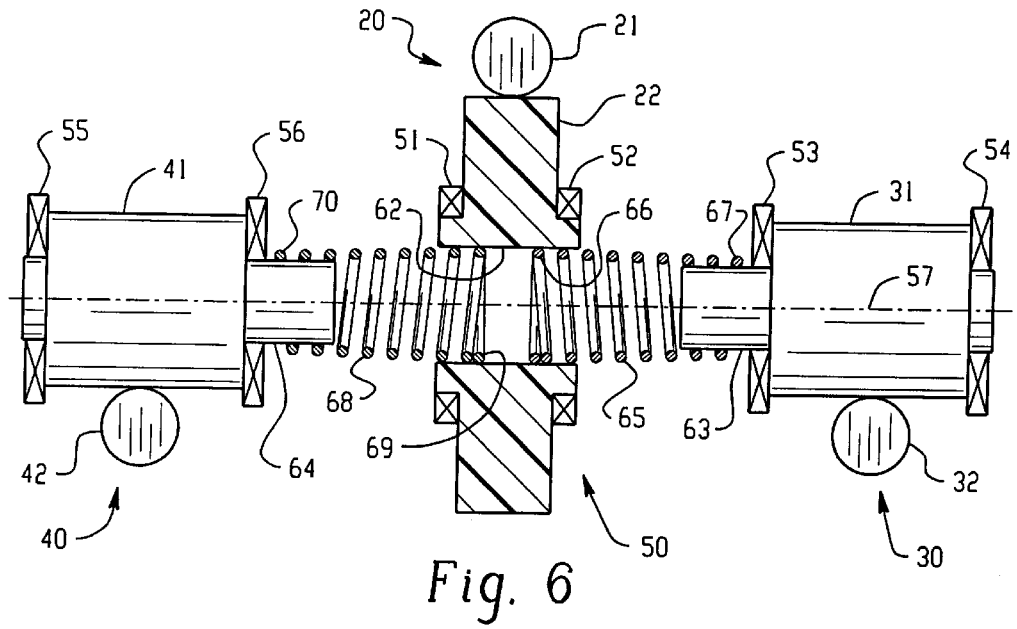
FIG. 6 schematically shows a cross section of an embodiment of a rotation-selective coupling.

Referring to FIG. 6, included between the primary worm wheel 22 and the two secondary worms 31, 41 is a rotation-selective coupling 50. Within the framework of the invention, by this is meant a coupling which transfers a rotation of the primary worm wheel 22 directed in one direction to the first secondary worm 31, and which transfers a rotation of the primary worm wheel 22 directed in the other direction to the second secondary worm 41. Hence, depending on the direction of rotation of the motor 14, the mirror blade 4 will perform an oscillating pivotal movement about one or the other pivotal axis 6,7.

The present invention provides different exemplary embodiments for such rotation-selective coupling 50, which will be discussed hereinbelow with reference to FIGS. 6–8.

A first exemplary embodiment of the rotation-selective coupling 50 is schematically illustrated in FIG. 6. The primary worm wheel 22 is rotatably bearing-mounted in two bearings 51, 52 forming part of the bottom portion 12 of the actuator housing 11. The first secondary worm 31 is rotatably bearing-mounted in two bearings 53, 54 forming part of the bottom portion 12 of the actuator housing 11, and the second secondary worm 41 is rotatably bearing-mounted in two bearings 55, 56 forming part of that bottom portion 12. The axes of rotation of the two secondary worms 31, 41 are aligned with the axis of rotation 57 of the primary worm wheel 22. The primary worm wheel 22 has an axial bore 62. The two secondary worms 31, 41 have axial portions 63, 64 directed towards the primary worm wheel 22.

Provided between the primary worm wheel 22 and the first secondary worm 31 is a first helical spring 65 having one end 66 thereof fixed to the primary worm wheel 22, for instance, and as shown, spring end 66 is clampingly received in the axial bore 62 of the primary worm wheel 22. The other end 67 of the helical spring 65 is received with a tight fit around the axis portion 63 of the first secondary worm 31. Similarly, a second helical spring 68 is provided between the primary worm wheel 22 and the second secondary worm 41. One end 69 of spring 68 is fixed to the primary worm wheel 22 while the other end of spring 68, 70 fits with a tight fit around the axis portion 64 of the second secondary worm 41. The pitches of the two helical springs 65 and 68 are in alignment.

In a structural variant, the two separate helical springs 65 and 68 may be replaced by a single continuous helical spring which has its central portion fixedly mounted in the primary worm wheel 22.

It will be noted that a helical spring having one end thereof wound around an axis has the characteristic that if the other end of that spiral is rotated in the direction of the pitch of that spiral, the windings of the first end tend to assume a large diameter and, accordingly, to slip relative to that axis, while if that other end of that spiral is rotated against the direction of the pitch, the windings of that first end tend to assume a smaller diameter and, accordingly, to clamp around that axis. Hence, during rotation of the primary worm wheel 22, one of the ends 67, 70 of the helical springs 65, 68 will clamp around the associated axis 63, 64 and drive the relevant secondary worm 31, 41, while the other one of those ends 70, 67 will slip and cannot draw the relevant secondary worm 41, 31 along against the counterforce offered by the relevant secondary worm wheel 42, 32.

Figure 7A:
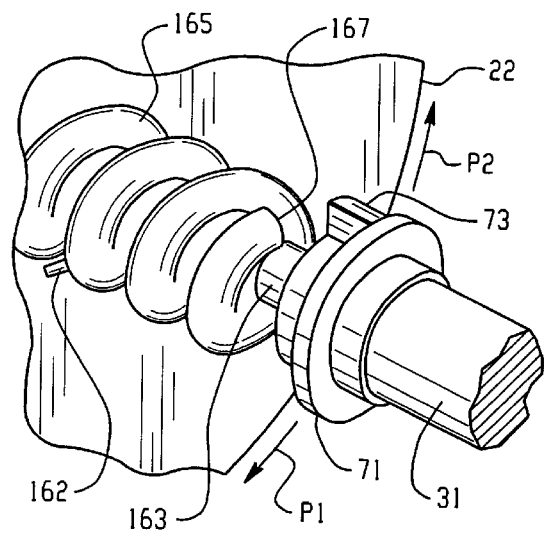
FIG. 7A is a schematic perspective view of a detail of a structural variant of a rotation-selective coupling.
Figure 7B:
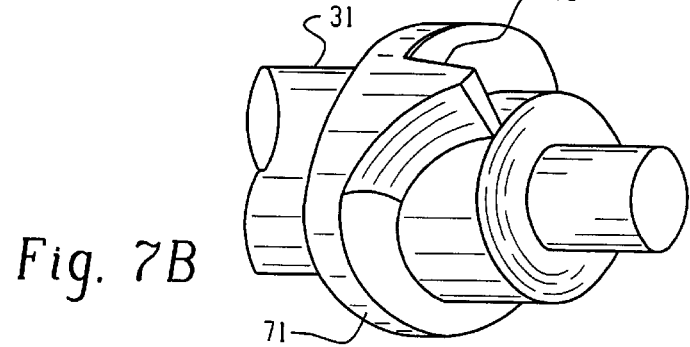
FIG. 7B is a schematic perspective view of the structural variant illustrated in FIG. 7A, viewed from a different direction.

FIG. 7A is a perspective view of a detail of a second embodiment, which can be considered a variant of the first embodiment discussed hereinabove with reference to FIG. 6. This second embodiment will therefore also be discussed with partial reference to FIG. 6. Unlike the first embodiment of FIG. 6, the helical spring ends 167, 170 of FIG. 7A are not clampingly provided around the axis portions 163, 164 of the secondary worms 31, 41, but are freely rotatable around those axis portions 163, 164. The helical springs 165, 168 are slightly elastically compressed relative to their rest conditions, i.e., a compressive stress condition prevails in the helical springs 165, 168, while their ends 167, 170 axially press against flanges 71, 72 respectively provided on the axis 63, 64. For simplicity's sake, FIG. 7A only shows the axis 163 of the first secondary worm 31 with the associated end 167 of the helical spring 165. Formed on the flange 71 is a cam 73 having a wedge-shaped outward appearance, as appears more clearly from the schematic perspective view of FIG. 7B, which shows the flange 71 viewed from a different direction. It will be understood by anyone skilled in that art that the end 167 of the helical spring 165 will take along that cam 73 formed on the worm 31 if the primary worm wheel 22 rotates in the direction as indicated by the arrow P1 in FIG. 7A, and that the end 167 of the helical spring 165 will not be able to take along that cam 73 formed on the worm 31 but will be axially compressed by that cam 73, if the primary worm wheel 22 rotates in the opposite direction as indicated by the arrow P2 in FIG. 7A.

Figure 8A:
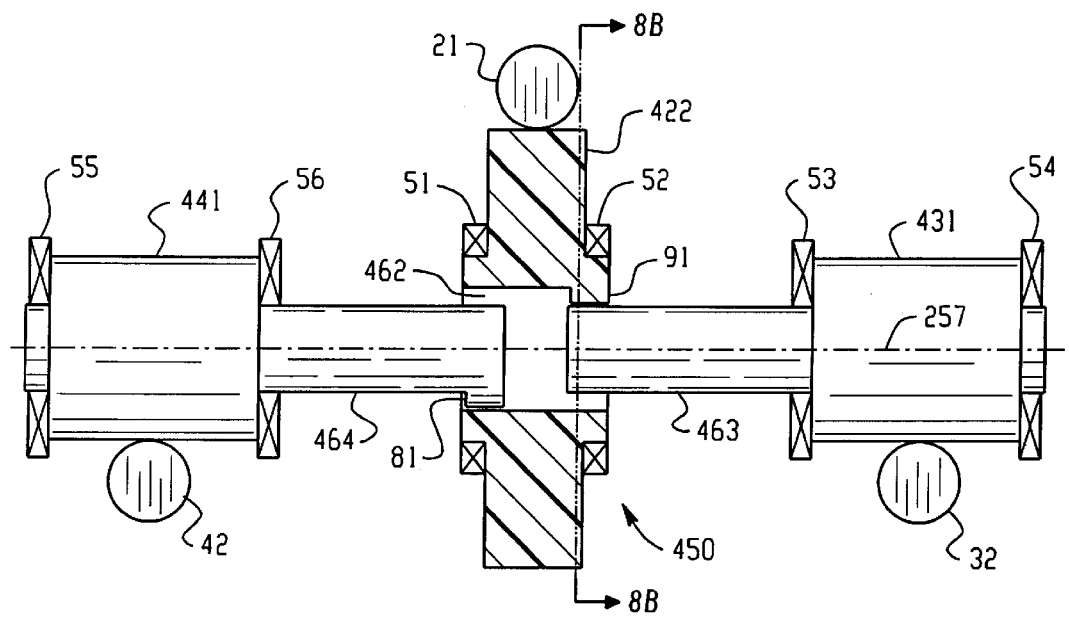
FIG. 8A schematically shows a cross section, comparable with FIG. 6, of a preferred embodiment of a rotation-selective coupling.
Figure 8B:
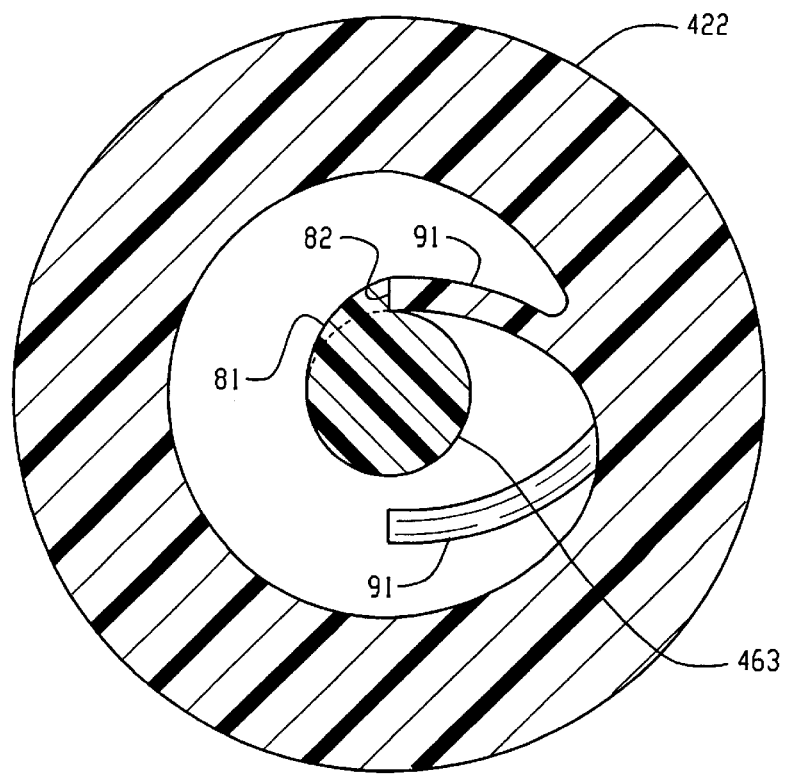
FIG. 8B schematically shows a section taken on the line 8B—8B in FIG. 8A.

FIG. 8A schematically shows a longitudinal section taken on the axis of rotation 457 of the primary worm wheel 422 of a third embodiment of the rotation-selective coupling 450, and FIG. 8B shows a cross section taken on the line 8B—8B in FIG. 8A. The axis portion 463 of the first secondary worm 431 extends into the central opening 462 of the primary worm wheel 422. The axis portion 463 comprises a cam 81 having a radially directed side face 82, while the other side face of the cam 81 has a gradually decreasing diameter. Instead of one cam 81, the axis 463 may alternatively comprise several cams, displaced relative to each other in circumferential direction.

Formed on the inner wall of the central opening 462 of the primary worm wheel 422 is a coupling finger 91, pointing inwards from that inner wall in a direction which makes an angle with a radial direction. The coupling finger 91 is slightly flexible, and can bend and/or pivot relative to the inner wall of the central opening 462 of the primary worm wheel 422. Instead of one coupling finger 91, the central opening 462 of the primary worm wheel 422 may be provided with several coupling fingers, displaced relative to each other in circumferential direction.

It will be understood by anyone skilled in the art that the coupling finger 91 which will take along the cam 81 formed on the worm 431 if the primary worm wheel 422 rotates in the direction as indicated by the arrow P1 in FIG. 8B, and that the coupling finger 91 will not be able to take along that cam 81 formed on the worm 431 but will be bent outwards by the cam 81, if the primary worm wheel 422 rotates in the opposite direction as indicated by the arrow P2 in FIG. 8B.

The primary worm wheel 422 is in a comparable manner provided with one or more coupling fingers which couple with the second secondary worm 441, the primary worm wheel 422 preferably being symmetrical, as will be understood by a skilled person.

An advantage of the first embodiment is that slipping of the spring end over the non-driven axis is virtually noiseless, whereas the other two embodiments produce a rattling noise. An advantage of the third embodiment is that it is simple to produce and assemble, and that it has fewer parts and is therefore more inexpensive, for which reason the third embodiment is preferred.

Figure 9A:
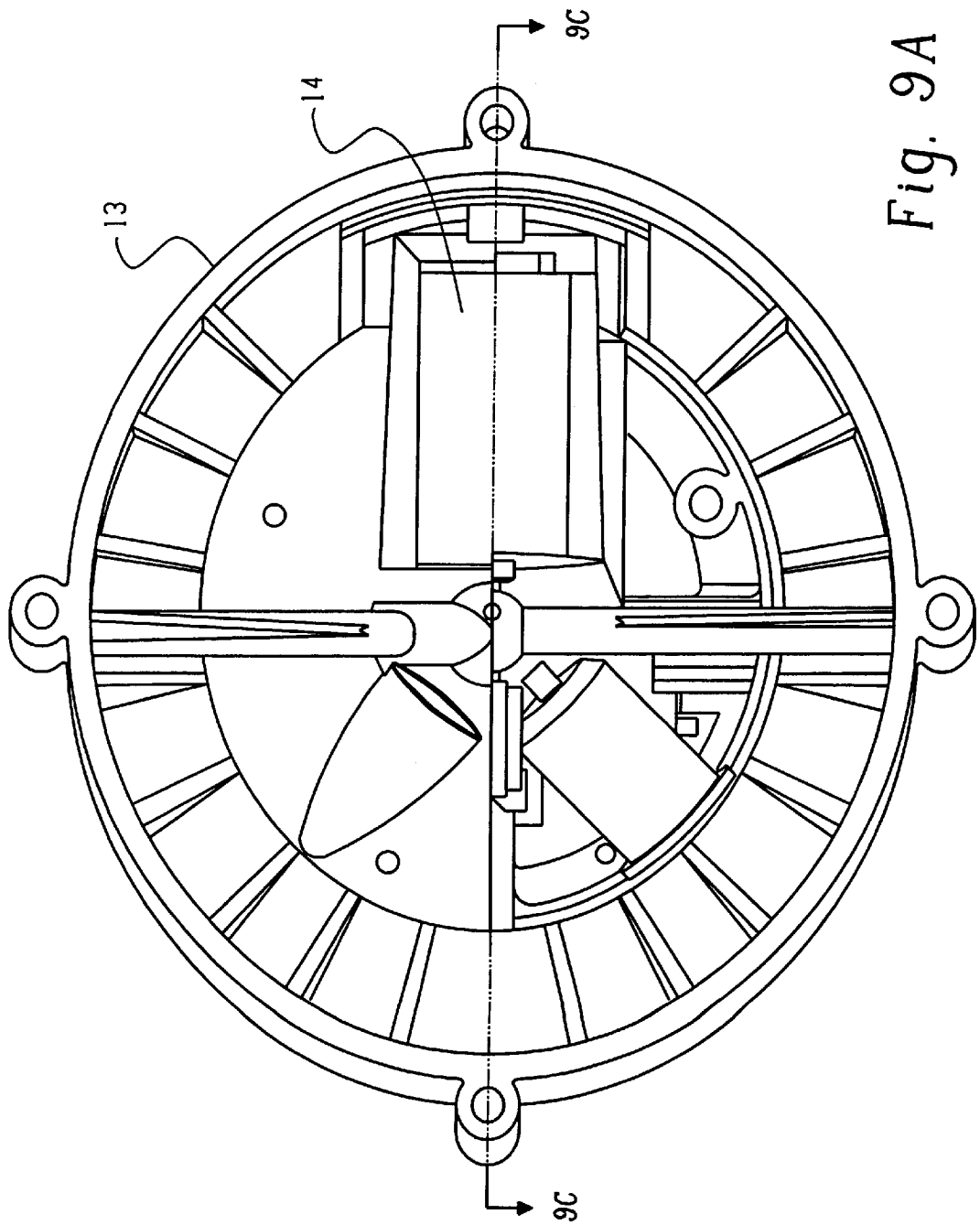
FIG. 9A is a top plan view of a practical embodiment of the actuator according to the present invention.
Figure 9B:
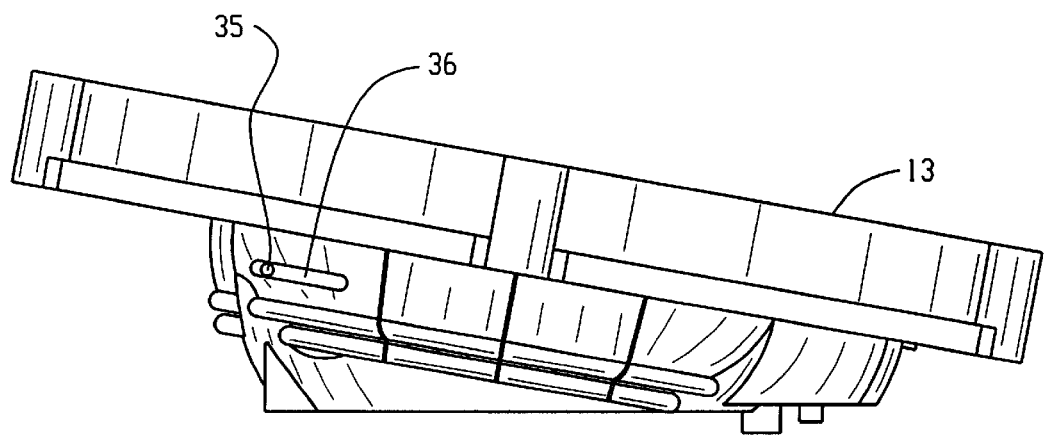
FIG. 9B is a side elevation of the actuator of FIG. 9A.
Figure 9C:
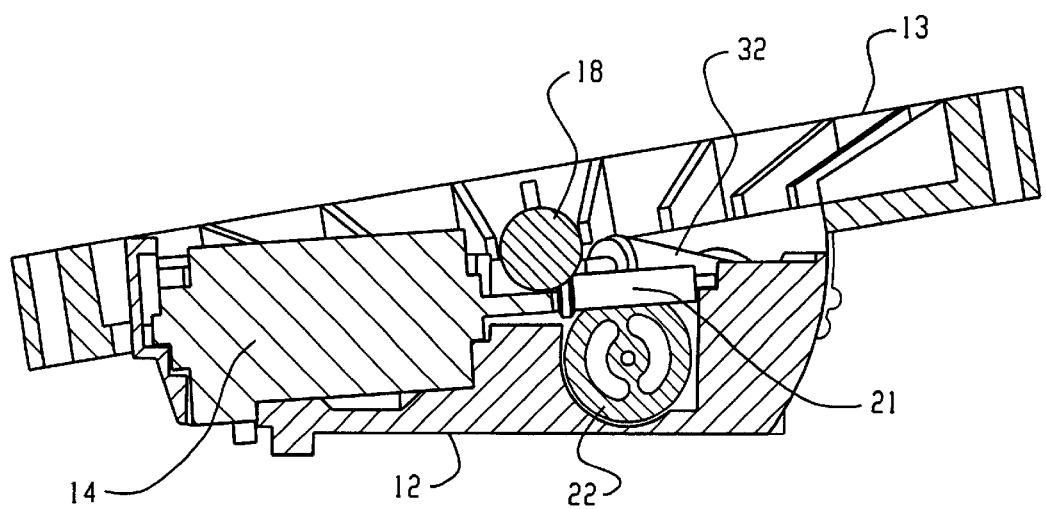
FIG. 9C shows a cross section taken along section-indicating line 9C—9C the actuator of FIG. 9A.

In the above description, the construction and operation of the present invention are explained with reference to schematic drawings. A practical embodiment of the actuator according to the present invention is illustrated in FIGS. 9A–C. These figures clearly demonstrate that the bottom part 12 and the cover part 13 of the actuator housing 11 are interconnected at a central point by a ball joint 18, acting as common pivot point for the horizontal pivotal movement and the vertical pivotal movement.

It will be readily understood by anyone skilled in the art that it is possible to change or modify the embodiment shown of the apparatus according to the invention without departing from the inventive concept or the protective scope as defined in the claims.

For instance, in respect of the embodiment illustrated in FIGS. 8A–B, it is possible that the helical spring 65 does not engage an outer surface of an axis portion 463, but an inner surface of an axial bore formed in the worm wheel 431. It is also possible that the helically wound helical springs 65, 68 are fixedly mounted on the axis portions 463; 464 of the secondary worms 431; 441 and are coupled with slip or via a ratchet coupling to the primary worm wheel 422.

Further, with respect to the embodiment illustrated in FIGS. 8A–B, it is for instance possible that the inner wall of the central openings 462 of the primary worm wheel 422 is provided with asymmetrical cams, while the axis portion 463, 464 extending into that central opening 462 is provided with flexible coupling fingers.

In the foregoing, it is described that the bottom portion 12 of the actuator housing 11 is attached to the mirror housing 2, and that the cover portion 13 is attached to the mirror support plate 5. However, it will be understood that the actuator housing 11 may also be mounted the other way round.

In the foregoing, the particular advantages of the present invention are described in connection with an actuator which comprises only one motor and which is intended for effecting four different movements. An important aspect of the present invention is a coupling member capable of converting a rotational movement into a cyclic movement of a movable part in two opposite directions, which coupling member, according to the invention, is constructed as a worm wheel comprising an axially directed, but eccentrically positioned coupling pin for engagement in an elongated slot. However, such coupling member is also useful in an actuator involving one motor for effecting two different movements, or two motors for effecting four different movements.

What is claimed is:

1. A one-motor actuator, comprising:

a first reduction step formed by a primary worm and a primary worm wheel;

a second reduction step formed by a first secondary worm and a first secondary worm wheel;

a third reduction step formed by a second secondary worm and a second secondary worm wheel;

a rotation-selective coupling driven by the primary worm wheel and coupling on one side the first secondary worm and on another opposite side the second secondary worm;

an actuator housing, comprising a housing bottom and a housing cover capable of pivoting relative to the housing bottom about two different pivotal axes, said reduction steps being bearing-mounted relative to said housing bottom; wherein each of said secondary worm wheels is detachably coupled to mutually different portions of said housing cover for converting a rotation of a worm wheel into a cyclic pivotal movement of said housing cover about a respective one of said pivotal axes.

2. An actuator according to claim 1, wherein a worm wheel has an end face provided with an axially directed, but eccentrically positioned pin engaging in a recess or slot formed in a wall portion of the housing cover.

3. An actuator according to claim 2, wherein said wall portion is of slightly flexible design, so that during the occurrence of an external force, said pin can leave said slot by bending said wall portion.

4. An actuator according to claim 2, wherein said pin is axially displaceable relative to said worm wheel.

5. An actuator according to claim 4, wherein said pin is accommodated in a substantially axially directed bore in said worm wheel, while further disposed in said bore is a resilient member.

6. An actuator according to claim 4, wherein said pin is defined by a substantially L-shaped lip which is flexibly attached to said worm wheel.

7. An actuator according to claim 6, wherein said L-shaped lip and said worm wheel are integrally formed as one single member.

8. An actuator according to claim 1, wherein a worm wheel comprises a disk which is coaxially formed thereon and which has its face provided with a ridge, closed in itself, engaging in a recess or slot formed in a wall portion of the housing cover.

9. An actuator according to claim 8, wherein said wall portion is of slightly flexible design, so that, during the occurrence of an external force, said ridge can leave said slot by bending said wall portion.

10. An actuator according to claim 8, wherein the ridge is replaced by a groove and the slot is replaced by a projection.

11. An actuator according to claim 1, wherein said rotation-selective coupling comprises a first helically wound helical spring which is on one side rigidly attached to the primary worm wheel and on the other side coupled to the first secondary worm, and a second helically wound helical spring which is on one side rigidly attached to the primary worm wheel and on the other side coupled to the second secondary worm.

12. An actuator according to claim 11, wherein the rotation-selective coupling between the helical springs and the secondary worm are designed as wrap spring couplings.

13. An actuator according to claim 11, wherein each secondary worm is provided with a one-sidedly acting cam cooperating with the end of their respective helical spring.

14. In combination, the actuator defined in claim 11, and a wing mirror for a vehicle, comprising a mirror housing and a mirror plate pivotable relative to said mirror housing wherein said actuator is operatively connected for effecting said pivotal movement of said mirror plate relative to said minor housing.

15. An actuator according to claim 1, wherein said rotation-selective coupling is defined in that each secondary worm has an axis portion extending into an axial opening in the primary worm wheel, wherein projecting cams or fingers are provided on the outer surface of said axis portions and on the inner surface of said opening, which cooperate for transmitting a rotation in only one direction.

* * * * *